(12) United States Patent
Bohm et al.

(10) Patent No.: US 10,184,570 B2
(45) Date of Patent: Jan. 22, 2019

(54) VACUUM VALVE

(71) Applicant: VAT Holding AG, Haag (CH)

(72) Inventors: Christoph Bohm, Gams (CH); Roman Steffen, Rebstein (CH)

(73) Assignee: VAT Holding AG, Haag (CH)

( * ) Notice: Subject to any disclaimer, the term of this patent is extended or adjusted under 35 U.S.C. 154(b) by 0 days.

(21) Appl. No.: 15/557,605

(22) PCT Filed: Mar. 7, 2016

(86) PCT No.: PCT/EP2016/054730
§ 371 (c)(1),
(2) Date: Sep. 12, 2017

(87) PCT Pub. No.: WO2016/155976
PCT Pub. Date: Oct. 6, 2016

(65) Prior Publication Data
US 2018/0058591 A1    Mar. 1, 2018

(30) Foreign Application Priority Data

Mar. 27, 2015 (AT) .................................. A 181/2015

(51) Int. Cl.
*F16K 3/18*    (2006.01)
*F16K 51/02*   (2006.01)
(Continued)

(52) U.S. Cl.
CPC ............ *F16K 3/184* (2013.01); *F16K 3/0218* (2013.01); *F16K 31/043* (2013.01);
(Continued)

(58) Field of Classification Search
CPC .......... F16K 3/184; F16K 3/18; F16K 3/0218; F16K 3/0281; F16K 51/02;
(Continued)

(56) References Cited

U.S. PATENT DOCUMENTS 5,566,922 A * 10/1996 Tanaka .................... F16K 3/188
251/157
6,056,266 A    5/2000 Blecha
(Continued)

FOREIGN PATENT DOCUMENTS

DE    1190755    4/1965
DE    10196376   8/2008
(Continued)

*Primary Examiner* — Mary McManmon
*Assistant Examiner* — David Colon Morales
(74) *Attorney, Agent, or Firm* — Volpe and Koenig, P.C.

(57) ABSTRACT

The vacuum valve includes a closure member that can be moved, parallel to a longitudinal movement direction, between an open position in which it unblocks the valve opening and an intermediate position in which it covers the valve opening but is raised off the valve seat, and that can be moved, parallel to a transverse movement direction, between the intermediate position and a closed position in which it bears against the valve seat; a valve rod that bears the closure member is mounted for displacement parallel to the longitudinal and transverse movement directions; a displacement part rigidly connected to the valve rod; and a drive motor which rotates a driveshaft about an axis parallel to the longitudinal movement direction in order to move the closure member between the open position, the intermediate position and the closed position. The drive shaft has, in a first section, a longitudinal displacement cam member of a longitudinal displacement cam mechanism that interacts with a longitudinal displacement engagement member of the longitudinal displacement cam mechanism in order to move the closure member between the open position and the intermediate position, and has, in a second section, a transverse displacement cam member of a transverse displacement cam mechanism that interacts with a transverse displacement engagement member of the transverse placement engagement member of the transverse (Continued)

displacement cam mechanism in order to move the closure member between the intermediate position and the closed position.

11 Claims, 10 Drawing Sheets

(51) Int. Cl.
 *F16K 3/02* (2006.01)
 *F16K 31/528* (2006.01)
 *F16K 31/04* (2006.01)
(52) U.S. Cl.
 CPC .......... *F16K 31/5286* (2013.01); *F16K 51/02* (2013.01); *F16K 31/047* (2013.01)
(58) Field of Classification Search
 CPC ............... F16K 31/5286; F16K 31/528; F16K 31/52475; F16K 31/524; F16K 31/043; F16K 31/047
 See application file for complete search history.

(56) References Cited

U.S. PATENT DOCUMENTS

| | | | |
|---|---|---|---|
| 6,089,537 A * | 7/2000 | Olmsted | F16K 3/10 251/129.11 |
| 6,237,892 B1 | 5/2001 | Ito | |
| 6,328,051 B1 | 12/2001 | Maher | |
| 6,776,394 B2 * | 8/2004 | Lucas | F16K 51/02 251/203 |
| 6,899,316 B2 | 5/2005 | Duelli | |
| 7,066,443 B2 | 6/2006 | Ishigaki | |
| 7,611,122 B2 | 11/2009 | Tichy | |
| 7,762,527 B2 | 7/2010 | Schoen et al. | |
| 8,141,847 B2 * | 3/2012 | Fischer | F16K 3/18 137/2 |
| 8,177,190 B2 * | 5/2012 | Maerk | F16K 3/0218 251/158 |
| 8,382,066 B2 * | 2/2013 | Nagao | F16K 3/184 251/204 |
| 8,672,293 B2 | 3/2014 | Ehrne et al. | |
| 8,800,956 B2 * | 8/2014 | Ishigaki | F16K 3/16 251/203 |
| 8,960,641 B2 | 2/2015 | Blecha | |
| 9,004,090 B2 * | 4/2015 | Asai | E03B 7/006 137/15.09 |
| 9,732,860 B2 * | 8/2017 | Blecha | F16K 3/0218 |
| 9,957,745 B2 * | 5/2018 | Ehrne | F16K 51/02 |
| 9,976,655 B2 * | 5/2018 | Ehrne | F16K 51/02 |
| 2005/0045846 A1 | 3/2005 | Iwabuchi | |
| 2012/0258242 A1 | 10/2012 | Tsunoda et al. | |
| 2014/0183391 A1 | 7/2014 | Blecha | |
| 2016/0363240 A1 * | 12/2016 | Wagner | F16K 51/02 |
| 2017/0328125 A1 * | 11/2017 | Blecha | F16K 51/02 |

FOREIGN PATENT DOCUMENTS

| | | |
|---|---|---|
| EP | 1712822 | 10/2006 |
| WO | 2010034046 | 4/2010 |
| WO | 2014075757 | 5/2014 |

* cited by examiner

VACUUM VALVE

BACKGROUND

The invention relates to a vacuum valve, comprising a valve body with a valve opening which has an axis and is surrounded by a valve seat, a closure member which is adjustable parallel to a longitudinal adjustment direction between an open position, in which said closure member opens up the valve opening, and an intermediate position, in which said closure member covers the valve opening but is raised from the valve seat, and which is adjustable parallel to a transverse adjustment direction between the intermediate position and a closed position, in which said closure member lies against the valve seat, a valve rod which supports the closure member and is mounted displaceably parallel to the longitudinal adjustment direction and parallel to the transverse adjustment direction, a displacement part which is connected rigidly to the valve rod, and a drive motor by which a drive shaft is rotatable about an axis of rotation lying parallel to the longitudinal adjustment direction in order to adjust the closure member between the open position, the intermediate position and the closed position.

Vacuum valves, in which, in order to close the vacuum valve, the closure member is first of all displaced in a longitudinal adjustment direction, which lies parallel to the valve rod, from an open position into an intermediate position, in which the closure member covers the valve opening, but is still raised from the valve seat, and, as a result, is placed against the valve seat in a transverse adjustment direction lying at an angle to the longitudinal adjustment direction, are also referred to as L valves.

In the case of a non-generic design of L valves, the valve rod is mounted pivotably about an axis, which is at right angles to the longitudinal adjustment direction, in order to permit the adjustment of the valve plate from its intermediate position into its closed position and back. In order to pivot the valve rod about the axis, use can be made here of slotted guides, as is known, for example, from U.S. Pat. No. 6,237,892 B1, U.S. Pat. No. 7,066,443 B2 or US 2012/0258242 A1.

In the case of L valves, in which, in order to adjust the closure member between the intermediate position and the closed position, a parallel displacement of the closure member in a transverse adjustment direction at an angle, in particular right angles, to the longitudinal adjustment direction takes place, according to a conventional embodiment drive elements for adjusting the closure member between the intermediate position and the closed position are arranged on a supporting unit supporting the closure member, wherein the supporting unit is located within the valve housing of the vacuum valve and is attached to a valve rod which is led out of the vacuum region of the vacuum valve. Such embodiments of L valves are disclosed, for example, in U.S. Pat. No. 6,056,266 A, U.S. Pat. No. 6,899,316 B2 and U.S. Pat. No. 7,611,122 B2.

WO 2010/034046 A1, U.S. Pat. No. 7,762,527 B2 and WO 2014/075757 A1 disclose L valves, in which a linear displacement of the closure member between the intermediate position and the closed position takes place, wherein both a drive for the adjustment of the closure member between the open and the intermediate position and a drive for the adjustment of the closure member between the intermediate and the closed position are arranged outside the vacuum. The valve rod supporting the closure member is displaceable in parallel here both in the longitudinal adjustment direction and in the transverse adjustment direction. In the case of the vacuum valve shown in WO 2014/075757 A1, a transmission part which is guided displaceably in the longitudinal adjustment direction by rod-shaped guide parts is attached here to the valve rod outside the vacuum, wherein the rod-shaped guide parts are displaceable in the transverse adjustment direction which is at right angles to the longitudinal adjustment direction. In order to displace the rod-shaped guide parts and therefore the valve rod in the transverse adjustment direction, use is made of pneumatic piston-cylinder units which act on the rod-shaped guide parts. In order to displace the valve rod in the longitudinal adjustment direction, use is likewise made of pneumatic piston-cylinder units which act on the transmission part.

A vacuum valve of the type mentioned at the beginning is disclosed in EP 2 749 798 A1. For opening and closing the vacuum valve, use is made of a drive motor which rotates a drive shaft which is designed in the form of a spindle and the axis of rotation of which lies parallel to the longitudinal adjustment direction. An adjustment member which is adjusted in the longitudinal adjustment direction by rotation of the spindle is connected via an oblique connection, in particular an oblique surface guide or a parallelogram guide, to a displacement part which, for its part, is connected rigidly to the valve rod, specifically outside the vacuum region. The displacement part is guided displaceably between a first position and a second position parallel to the longitudinal adjustment direction, and between a second position and a third position parallel to the transverse adjustment direction, via a guide, in particular slotted guide. In the first, second, and third positions of the displacement part, the closure member takes up its open, intermediate and closed position. In addition to the gear members for transmitting the drive force from the drive motor to the valve rod, this vacuum valve is therefore also provided with guide elements which are of relatively complex design, in particular in the form of a slotted guide, in order to guide the movements in the longitudinal adjustment direction and transverse adjustment direction.

SUMMARY

It is the object of the invention to provide an advantageous vacuum valve of the type mentioned at the beginning, in which movement of the closure member parallel to the longitudinal adjustment direction (between the open position and intermediate position) and parallel to the transverse adjustment direction (between the intermediate position and closed position) is achieved in an expedient manner. This is achieved by a vacuum valve with one or more features of the invention.

In the case of the vacuum valve according to the invention, the drive shaft that is rotated by the drive motor in order to open and close the vacuum valve has, in a first portion, a longitudinal displacement cam member of a longitudinal displacement cam mechanism. In order to adjust the closure member between the open position and the intermediate position, said closure member interacts with a longitudinal displacement engagement member of the longitudinal displacement cam mechanism. In a second portion, the drive shaft has a transverse displacement cam member of a transverse displacement cam mechanism. This transverse displacement cam member interacts with a transverse displacement engagement member of the transverse displacement cam mechanism in order to adjust the closure member between the intermediate position and the closed position. The longitudinal displacement engagement member of the longitudinal displacement cam mechanism is connected non-displaceably with respect to the longitudinal adjustment direction (i.e. parallel to the longitudinal adjustment direction) to a displacement part which is rigidly connected to the valve rod. The transverse displacement engagement member of the transverse displacement cam mechanism is connected non-displaceably with respect to the transverse adjustment direction (i.e. parallel to the transverse adjustment direction) to the displacement part.

Cam members both of a cam mechanism for displacing the closure member parallel to the longitudinal adjustment direction and a cam mechanism for displacing the closure member parallel to the transverse adjustment direction are therefore formed by the drive shaft. Advantageous guidance of the movement of the valve rod and therefore of the closure member parallel to the longitudinal adjustment direction and parallel to the transverse adjustment direction is thereby made possible.

Starting from the open position of the closure member, by rotation of the at least one drive shaft in a closing direction of rotation, the longitudinal displacement engagement member can be displaced parallel to the longitudinal adjustment direction by the longitudinal displacement cam member, wherein the displacement part is carried along and the closure member is displaced from the open position in the direction of the intermediate position. Starting from the intermediate position of the closure member, the transverse displacement engagement member can be displaced parallel to the transverse adjustment direction by the transverse displacement cam member by rotation of the at least one drive shaft in the closing direction of rotation, wherein the displacement part is carried along and the closure member is displaced from the intermediate position in the direction of the closed position.

The displaceable mounting of the valve rod parallel to the longitudinal adjustment direction and parallel to the transverse adjustment direction can advantageously take place by a displaceable mounting of the displacement part, which is rigidly connected to the valve rod, parallel to said directions.

For this purpose, in one possible embodiment, at least one longitudinal linear guide can be provided for the displacement part, said longitudinal linear guide supporting the displacement part displaceably parallel to the longitudinal adjustment direction. Furthermore, said at least one longitudinal linear guide can be mounted displaceably parallel to the transverse adjustment direction by at least one transverse linear guide. The longitudinal displacement engagement member of the at least one longitudinal displacement cam mechanism and the transverse displacement engagement member of the at least one transverse displacement cam mechanism can be arranged directly here on the displacement part.

In an alternative embodiment, at least one longitudinal linear guide can be provided which displaceably supports a slide parallel to the longitudinal adjustment direction. Furthermore, the displacement part can be mounted so as to be displaceable in relation to the slide parallel to the transverse adjustment direction. In this connection, the longitudinal displacement engagement member of the at least one longitudinal displacement cam mechanism can advantageously be arranged here on the slide, wherein the displacement part is held relative to the slide so as to be non-displaceable with respect to the longitudinal adjustment direction. An arrangement directly on the displacement part is also conceivable and possible. The transverse displacement engagement member of the at least one transverse displacement cam mechanism can be arranged directly on the displacement part.

In order to move the closure member both in a direction directed from the intermediate position into the closed position and in the opposite direction, the second portion of the drive shaft can advantageously have first and second transverse displacement cam members which form a double cam disk and which interact with first and second transverse displacement engagement members which are connected to the displacement part so as to be non-displaceable with respect to the transverse adjustment direction. A forced guidance in both directions parallel to the transverse adjustment direction is therefore formed. Such a forced guidance could also be formed, for example, by a groove guide of the transverse displacement engagement member. On the other hand, the transverse displacement cam mechanism could also have only one individual cam disk, onto the outer surface of which the transverse displacement engagement member interacting therewith is pressed by a spring.

The cam formed by the longitudinal displacement cam member advantageously has a slope-free portion and the longitudinal displacement engagement member is located in the latter when the closure member takes up the intermediate position. When the longitudinal displacement engagement member is located in said portion, upon rotation of the drive shaft no displacement of the valve rod parallel to the longitudinal adjustment direction takes place, and also displacement of the longitudinal displacement engagement member in relation to the longitudinal displacement cam member parallel to the transverse adjustment direction is possible by the transverse displacement cam mechanism.

The longitudinal displacement cam mechanism is in particular a cylindrical cam mechanism.

In an expedient embodiment, the vacuum valve furthermore has a locking device by which the rotation of the drive shaft about the axis of rotation is blockable. By the use of this, when the operating means of the drive motor, said operating means being formed in particular by electrical energy, fails, blocking of the rotational position of the drive shaft and therefore also locking of the position of the closure member, in particular in the closed position or in the open position, can be achieved.

In an advantageous development of the invention, there are first and second drive shafts which are driven about axes of rotation lying parallel to one another by a respective drive motor or a common drive motor and which each have, in a first portion, a longitudinal displacement cam member of a longitudinal displacement cam mechanism that interacts in each case with a longitudinal displacement engagement member of the respective longitudinal displacement cam mechanism, and which each have, in a second portion, a transverse displacement cam member of a respective transverse displacement cam mechanism that interacts in each case with a transverse displacement engagement member of the respective transverse displacement cam mechanism.

By use of the embodiment according to the invention, simple control or regulation of the contact pressure force of the closure member against the valve seat is also made possible, wherein this contact pressure force can be set to different values. For example, the loading of the elastic sealing ring can therefore be reduced if no differential pressure is present, and therefore the service life of the elastic sealing ring which seals the closure member from the valve seat can be optimized.

BRIEF DESCRIPTION OF THE DRAWINGS

Further advantages and details of the invention are explained below with reference to the attached drawing, in which:

FIGS. 3 to 8 show sections along the lines AA, BB, CC, DD, EE and FF in FIG. 2;

DETAILED DESCRIPTION OF THE PREFERRED EMBODIMENTS

An exemplary embodiment of a vacuum valve according to the invention is illustrated in FIGS. 1 to 28.

The vacuum valve has a valve body 1 which has a wall which has a valve opening 2 with an axis 3. In the closed state of the vacuum valve, the valve opening 2 is closed by a closure member 4 which is in particular of plate-like design and which then takes up its closed position. In the closed position of the closure member 4, the latter is pressed against a valve seat 5 which surrounds the valve opening 2 on the side facing the closure member 4. In the open state of the vacuum valve, the closure member 4 opens up the valve opening 2 and the closure member 4 then takes up its open position. The adjustment of the closure member 4 between the closed position and the open position takes place via an intermediate position, in which the closure member covers the valve opening 2, as seen in the direction of the axis 3 of the valve opening 2, i.e. lies opposite the valve seat 5, but is raised (=spaced apart) from the valve seat 5.

For sealing between the closure member 4 and the wall, which has the valve opening 2, of the valve body 1 in the closed position of the closure member 4, use is made of an elastic sealing ring 6 (for example composed of FPM or FFPM) arranged on the closure member 4, and the valve seat 5 has a sealing surface against which the sealing ring 6 is pressed. In principle, the sealing ring 6 could also be arranged on the sealing seat and pressed against a sealing surface of the closure member 4.

In the exemplary embodiment, the valve body 1 is designed in the manner of a housing and can therefore also be referred to as the valve housing, and the closure member 4 is arranged in an interior space 7 of the valve body 1. This interior space 7 of the valve body 1 forms a vacuum region of the vacuum valve (=a region in which there can be a vacuum). In a further wall, the valve body 1 has a further opening 8, and therefore a passage channel is formed through the valve body 1. In the exemplary embodiment, said passage channel runs rectilinearly in the direction of the axis 3.

In the exemplary embodiment, the valve body 1 has a further opening which is closed by a cover part 45 and by which maintenance is simplified. However, said opening and the cover part 45 could also be omitted.

The valve body 1 can be connected to other parts of a vacuum system, for example vacuum chambers and/or pipes. In the open position of the closure member 4, the interior space 7 of the valve body 1 is then connected to the interior space of a first part of the vacuum system via the valve opening 2, and the interior space 7 is connected to the interior space of a further part of the vacuum system via the opening 8.

The vacuum valve could basically also be designed as what is referred to as an insert, wherein, in the operating state of the vacuum valve, the valve body 1 would be arranged in the interior space of a vacuum chamber on a wall of the vacuum chamber and in a sealed manner with respect thereto, and therefore the valve opening 2 is aligned with an opening in the wall of the vacuum chamber. The opposite wall of the vacuum valve with the opening 8 could then be omitted. The closure member 4 is then also arranged in a vacuum region of the vacuum valve.

The closure member 4 is supported by a valve rod 9, in the exemplary embodiment via a connecting piece 12 fastened at one end to the valve rod and at the other end to the closure member. The valve rod is led out of the vacuum region of the vacuum valve through an opening in the valve body 1, wherein said valve rod is movable in the direction of its longitudinal axis 10 and also in a direction at right angles thereto. For this purpose, an expansion bellows 11 is used in the exemplary embodiment. A different type of vacuum lead through can basically also be provided for this purpose, for example a different type of bellows or a linear lead through which is itself mounted displaceably in a sealed manner in relation to the valve body in a direction at right angles to the direction of the lead through.

Outside the vacuum region, a displacement part 13 is fastened rigidly to the valve rod 9. The displacement part 13, which is of multi-part design in the exemplary embodiment, is supported by a support device so as to be displaceable parallel to a longitudinal adjustment direction 14 and parallel to a transverse adjustment direction 15, which is at right angles to the longitudinal adjustment direction 14. By displacement of the displacement part 13 parallel to the longitudinal adjustment direction 14, the valve rod 9 and therefore the closure member 4 are displaced parallel to the longitudinal adjustment direction 14. The adjustment of the closure member 4 between the open position and the intermediate position takes place by such a displacement of the displacement part 13 parallel to the longitudinal adjustment direction 14.

By an adjustment of the displacement part 13 parallel to the transverse adjustment direction 15, displacement of the valve rod 9 and therefore of the closure member 4 parallel to the transverse adjustment direction 15 takes place. The adjustment of the closure member 4 between the intermediate position and the closed position takes place by such a displacement of the displacement part 13 parallel to the transverse adjustment direction 15.

The longitudinal axis 10 of the valve rod 9 lies parallel to the longitudinal adjustment direction 14, as a result of which simple leading of the valve rod 9 out of the vacuum region is advantageously made possible.

The axis 3 of the valve opening 2 lies parallel to the transverse adjustment direction 15, and the valve seat 5 lies in a plane at right angles thereto, as a result of which the closure member 4 is advantageously placed parallel onto the valve seat 5. However, a certain deviation from such a parallel placement would in principle be tolerable.

The bearing device for the displaceable mounting of the displacement part 13 parallel to the longitudinal adjustment direction 14 and parallel to the transverse adjustment direction 15 comprises, in the exemplary embodiment shown, longitudinal guide rods 16 which pass through openings in the displacement part 13, in which openings guide bushings 17 for forming a sliding guide are arranged. For example, there are two longitudinal guide rods 16 arranged on both sides of the valve rod 9. The longitudinal guide rods 16 lie parallel to the longitudinal adjustment direction 14 and are themselves guided displaceably parallel to the transverse adjustment direction 15. For this purpose, in the exemplary embodiment, transverse guide rods 18 pass through openings in the longitudinal guide rods 16, which openings are arranged in the two end regions of the longitudinal guide rods 16 and in which guide bushings 19 for forming a sliding guide are arranged. The transverse guide rods lie parallel to the transverse adjustment direction 15 and are attached to a supporting body 20 which is connected rigidly to the valve body 1.

The longitudinal guide rods 16 together with those parts of the displacement part 13 which form the displacement guide therefore form longitudinal linear guides for the displacement part 13 that are designed in the manner of shaft guides. At least one differently designed longitudinal linear guide for the displaceable mounting of the displacement part 13 parallel to the longitudinal adjustment direction 14 could also be provided, for example a rail guide or slotted guide. In the case of a rail guide, guide rails could be provided, by which slides (which are parts of the displacement part) are displaceably guided. In the case of a slotted guide, guide tracks could be provided which are formed by elongated holes, grooves or beads and along which corresponding engagement elements are displaceably guided.

Instead of a sliding guide, a roller guide could also be provided.

The transverse guide rods 8 together with the parts for the displaceable mounting of the longitudinal guide rods 16 along the transverse guide rods 18 form transverse linear guides which, in the exemplary embodiment, are designed in the manner of shaft guides. At least one differently designed transverse linear guide for the displaceable guidance of the displacement part 13 parallel to the transverse displacement direction 15 could also be provided, for example a rail guide or a slotted guide.

Instead of a sliding guide, a roller guide could also be provided.

Drive shafts 21, 22 interact with the displacement part 13 in order to move the displacement part 13 parallel to the longitudinal adjustment direction 14 and parallel to the transverse adjustment direction 15. The drive shafts 21, 22 arranged on opposite sides of the valve rod 9 are each mounted rotatably about an axis of rotation 23 lying parallel to the longitudinal adjustment direction 14. In the exemplary embodiment, this rotatable mounting takes place in relation to the supporting body 20 via rolling bearings 24.

Drive motors 25, 26 serve for rotating the drive shafts 21, 22 about their axes of rotation 23. Each drive shaft 21, 22 is driven by the respective drive motor 25, 26 in each case via a gearing which, in the exemplary embodiment, comprises gear wheels 27, 28, 29 and 30.

The drive motors 25, 26 are electric motors, for example DC motors, brushless or with brushes, or else synchronous motors, asynchronous motors or stepping motors. When DC motors, synchronous motors or asynchronous motors are used, the synchronization of the drive motors 25, 26 can take place by a controller (not illustrated in the figures) by corresponding transmitters (not illustrated in the figures), for example rotary transmitters or Hall sensors. When stepping motors are used, the drive motors 25, 26 can be activated synchronously by predetermining the same number of steps and/or corresponding transmitters can likewise be used for the synchronization.

Instead of electric drive motors 25, 26, use can in principle also be made of other drive motors, by which the drive shafts 21, 22 can be rotated about the respective axis of rotation 23, for example pneumatic or hydraulic motors, wherein, in the case of more than one drive shaft 21, 22 and in the case of separate motors for driving the drive shafts, a corresponding synchronization of the rotation of the drive shafts would be required.

There could also be only one drive motor which rotates the two drive shafts 21, 22 about their respective axis of rotation 23 via corresponding gear elements, for example a toothed belt. Also if dedicated drive motors are used for each drive shaft, a mechanical synchronization would be conceivable and possible in such a manner.

For the displacement of the displacement part 13 and therefore of the valve rod 9 and of the closure member 4 parallel to the longitudinal adjustment direction 14, in order to adjust the closure member 4 between the open position and the intermediate position, use is made of longitudinal displacement cam mechanisms. The latter each comprise a longitudinal displacement cam member 31 which is formed in a first portion of the longitudinal extent of the respective drive shaft 21, 22, and a longitudinal displacement engagement member 32 which interacts with a respective longitudinal displacement cam member 31 and is arranged on the displacement part 13. In the exemplary embodiment, said longitudinal displacement engagement member is formed by a pin 32*a* which is fixed in the displacement part 13 and on which a roller 32*b* is mounted rotatably about an axis at right angles to the axis of rotation 23. A roller 32*b* could basically also be omitted and a pin could be guided in a sliding manner in the longitudinal displacement cam member 31.

A respective longitudinal displacement cam member 31 is formed by a groove which runs in a helical curve around the circumference of the drive shaft 21, 22. The roller 32*b* engages in said groove and can roll along the groove flanks, or alternatively a pin engages therein. Instead of such a groove cam, there could also be a rim cam, with which a correspondingly designed engagement member interacts. A respective longitudinal displacement cam member 31 together with the longitudinal displacement engagement member 32 interacting therewith forms a respective cylindrical cam mechanism.

The cam formed by the longitudinal displacement cam member 31 has a slope-free portion 31*b* in addition to the portion 31*a* in which it has a slope with respect to the longitudinal adjustment direction 14. When the longitudinal displacement engagement member 32 is in engagement with the portion 31*a*, upon rotation of the drive shaft 21, 22 the longitudinal displacement engagement member 32 is displaced parallel to the longitudinal adjustment direction 14. When the longitudinal displacement engagement member is in engagement with the portion 31b, rotation of the drive shaft 21, 22 does not bring about displacement of the longitudinal displacement engagement member 32 parallel to the longitudinal adjustment direction 14. The longitudinal displacement engagement member 32 enters into the slope-free portion 31b when the closure member 4, during its adjustment from the open position in the direction of the intermediate position, reaches the intermediate position at the end of the adjustment travel.

In the exemplary embodiment, the cam formed by the longitudinal displacement cam member 31 extends by less than 360° about the circumference of the drive shaft 21, 22 in the portion 31a over which said cam has a slope. For example, said portion 31a over which said cam runs with a slope (with respect to the longitudinal adjustment direction 14) extends over 180° to 320°. In order to adjust the closure member 4 from the open position into the intermediate position, rotation of the respective drive shaft 21, 22 by less than 360° is therefore required. For example, said angle of rotation of the respective drive shaft 21, 22 therefore lies within the range of 180° to 320°.

Transverse displacement cam mechanisms serve for displacing the displacement part 13, and therefore the valve rod 9 and the closure member 4, parallel to the transverse adjustment direction 15 in order to adjust the closure member 4 between its intermediate position and its closed position. In the exemplary embodiment, a respective transverse displacement cam mechanism comprises a first and a second transverse displacement cam member 33, 34 which are formed in a second portion of the longitudinal extent of the respective drive shaft 21, 22. First and second transverse displacement engagement members 35, 36 which are arranged on the displacement part 13 interact with the first and second transverse displacement cam members 33, 34.

The first and second transverse displacement cam members 33, 34 are designed in the form of cam disks, the outer surfaces of which interact with the transverse displacement engagement members 35, 36, wherein the outer surfaces of the transverse displacement cam members 33, 34 change their distance in the circumferential direction about the axis of rotation 23 in regions interacting with the transverse displacement engagement members 35, 36. The transverse displacement cam members 33, 34 may also be referred to as cam disks.

The first transverse displacement cam member 33 and the first transverse displacement engagement member 35 interact in order to adjust the closure member 4 from the intermediate position into the closed position. The second transverse displacement cam member 34 and the second transverse displacement engagement member 36 interact in order to adjust the closure member 4 from the closed position into the intermediate position.

There is a rolling contact between the first transverse displacement cam members 33 and the first transverse displacement engagement members 35 via which the contact pressure force pressing the closure member 4 against the valve seat 5 in the closed position is transmitted. For this purpose, the first transverse displacement engagement members 35 each have a roller 35b which is mounted by a support 35a and an axle pin 35c, which is held on the support 35a, so as to be rotatable about an axis lying parallel to the axis of rotation 23. However, there could also be a sliding contact between the respective first transverse displacement cam member 33 and the respective first transverse displacement engagement member 35. In the exemplary embodiment shown, there is a sliding contact between the respective second transverse displacement cam member 34 and the respective second transverse displacement engagement member 36. However, there could also be a rolling contact formed between said parts.

The first and second transverse displacement engagement members 35, 36 therefore each form a double cam disk. However, it could also be possible to in each case provide only a single cam disk which interacts with a single engagement member, wherein the contact between the cam member and the engagement member is kept by a spring, and therefore an adjustment in both directions parallel to the transverse adjustment direction is made possible. The spring could act here, for example, in the opening direction.

In order to close the vacuum valve from the open state, in which the closure member 4 takes up the open position, the drive shafts 21, 22 are rotated in the respective closing direction of rotation 38, 39. In the exemplary embodiment, the closing directions of rotation of the drive shafts 21, 22 are opposed. However, the closing directions of rotation 38, 39 of the drive shafts 21, 22 could also be unidirectional.

In the open position of the closure member 4, the first transverse displacement engagement members 35 are spaced apart from the first transverse displacement cam members 33, and the second transverse displacement engagement members 36 are spaced apart from the second transverse displacement cam members 34, with respect to the longitudinal adjustment direction 14. Only towards the end of the adjustment travel of the closure member 4 from the open position into the intermediate position do the first transverse displacement engagement members 35 enter into overlap (with respect to the longitudinal adjustment direction 14) with the first transverse displacement cam members 33, and the second transverse displacement engagement members 36 enter into overlap (with respect to the longitudinal adjustment direction 14) with the second transverse displacement cam members 34. Upon further rotation of the drive shafts 21, 22 in the respective closing direction of rotation 38, 39, no further adjustment of the closure member 4 in the longitudinal adjustment direction 14 takes place since the longitudinal displacement engagement members 32 are now in the regions of the slope-free portions 31b of the cams of the longitudinal displacement cam members 31. Upon said further rotation of the drive shafts 21, 22 in the respective closing direction of rotation 38, 39, the first transverse displacement cam members 33 displace the first transverse displacement engagement members 35 parallel to the transverse adjustment direction 15, as a result of which the closure member 4 is displaced from the intermediate position into the closed position and is pressed against the valve seat 5.

If, in the closed position of the closure member 4, the drive shafts 21, 22 are each rotated in an opening direction of rotation opposed to the respective closed direction of rotation 38, 39, first of all the second transverse displacement cam members 34 displace the second transverse displacement engagement members 36 parallel to the transverse adjustment direction 15, as a result of which the closure member 4 is adjusted from the closed position into the intermediate position. As already mentioned, instead of the second transverse displacement cam members 34 and second transverse displacement engagement members 36, there could be at least one spring which, upon this rotation of the drive shafts 21, 22, keeps the longitudinal displacement engagement members 32 in contact with the longitudinal displacement cam members 31 and displaces the closure member 4 from the closed position into the intermediate position. Upon further rotation of the drive shafts 21, 22 in the respective opening direction of rotation, the longitudinal displacement engagement members 32 pass into those portions 31a of the cams of the longitudinal displacement cam members 31 in which there is a slope with respect to the longitudinal adjustment direction 14, and the adjustment of the closure member 4 from the intermediate position into the open position takes place.

A further possible modification makes provision for the first transverse displacement cam members 33 and first transverse displacement engagement members 35 to be omitted and for at least one closing spring to keep the second transverse displacement engagement members 36 in contact with the second transverse displacement cam members 34 and to adjust the closure member 4 from the intermediate position into the closed position when the drive shafts 21, 22 are rotated in the closing directions of rotation.

When the longitudinal displacement engagement members 32 are in the slope-free portions 31b, a relative displacement of the longitudinal displacement cam members 31 to the longitudinal displacement engagement members 32 parallel to the transverse adjustment direction 15 is also possible. For this purpose, a corresponding play s is provided in this direction between the drive shafts 21, 22 and the through openings 37 in the displacement part 13, through which the drive shafts pass, cf. FIG. 6.

In the intermediate position, in the closed position and in all positions located in between, at least one transverse displacement engagement member 35, 36 is therefore in engagement with an associated transverse displacement cam member 33, 34.

It would also be conceivable and possible for the slope-free portions 31b of the longitudinal displacement cam members to be omitted and for the longitudinal displacement engagement members 32 to be disengaged from the longitudinal displacement cam members at the end of the adjustment travel of the closure member 4 from the open position into the intermediate position. For example, the longitudinal displacement cam members 31 here could have rim cams which only run over the portion 31a and against the one side flank of which the longitudinal displacement engagement members 32 are pressed by springs acting in the opening direction, wherein, when the intermediate position of the closure member 4 is reached, the displacement part 13 is held counter to a displacement, which is brought about by said spring, by a latching mechanism (but is displaceable here in the transverse adjustment direction 15), and said latching mechanism is released again only when the closure member is reset from the closed position into the intermediate position.

The valve rod 9 extends with respect to the longitudinal adjustment direction 14 beyond the region in which the displacement part 14 is located in a direction directed away from the closure member 4. In this portion of its longitudinal extent, preferably in the region of its end remote from the closure member 4, the valve rod 9 is supported on a support part 42, which is held fixed on the valve body, in the closed position of the closure member 4. The support part 42 lies with respect to the transverse adjustment direction 15 on the same side of the valve rod 9 as the valve seat 5. By this support of the valve rod 9, the torques acting on the guide device of the displacement part 13 are reduced and preferably at least substantially neutralized (if the displacement part 13 is located in the center of the valve rod 9, as is preferred). The support part 42 is advantageously of elastic design, preferably with an elasticity similar to the sealing ring 6.

In the exemplary embodiment shown, there is furthermore a locking device 40 for a respective drive shaft 21, 22, by which locking device the rotation of the drive shafts 21, 22 can be blocked. For example, rotation of the drive shafts 21, 22 can be blocked when the closure member 4 is in the closed position. It is therefore possible for the closed state of the vacuum valve to be secured even in the event of failure of the operating means of the drive motors 25, 26, said operating means therefore being formed in the exemplary embodiment by electrical energy. In the exemplary embodiment, the locking device 40 has a gearwheel 41 which is in engagement with one of the gearwheels 28 of the gearing. A blocking member of the locking device 40 can be kept by the operating means of the drive motors 25, 26 at a distance from a shaft, which is connected to the gearwheel 41, counter to the force of a spring and, if the operating means fails, can be pressed against the shaft by the spring. This is not illustrated specifically in the figures. Therefore, when the operating means of the drive motors 25, 26 fails, the closure member 4 can therefore be locked in the position which it has just taken up.

A locking device of this kind could also interact directly with the motor shaft driven by the drive motor.

In principle, it could also be possible for there to be more than two drive shafts 21, 22 driven by at least one drive motor or only a single drive shaft driven by a drive motor. Should only a single drive shaft be present, this should advantageously be placed centrally with respect to the closure member 4, with respect to a direction at right angles to the longitudinal adjustment direction 14 and at right angles to the transverse adjustment direction 15 (i.e., in the exemplary embodiment, upstream or downstream of the valve rod 9) so that the contact pressure force of the closure member 4 can be exerted centrally on the valve seat 5.

Instead of a single valve rod 9, two or more parallel valve rods 9 which jointly support the closure member 4 could also be provided.

The at least one drive motor could also drive the at least one drive shaft directly, without an interconnected gearing.

Different further modifications of the exemplary embodiment shown are conceivable and possible without departing from the scope of the invention.

Figure 1:
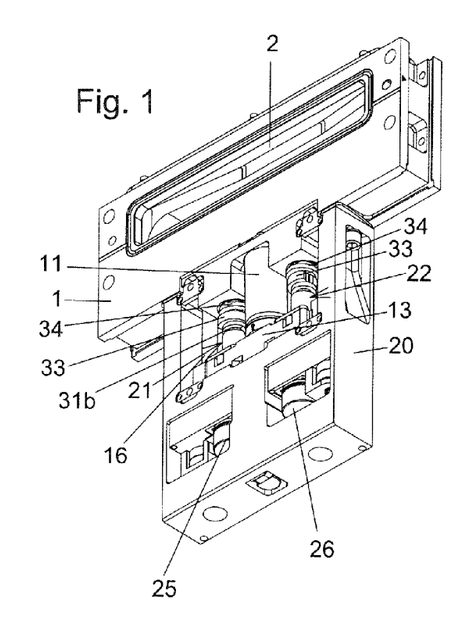
FIGS. 1 and 2 show a perspective view and view of an exemplary embodiment of a vacuum valve according to the invention in the open position of the closure member.
Figure 2:
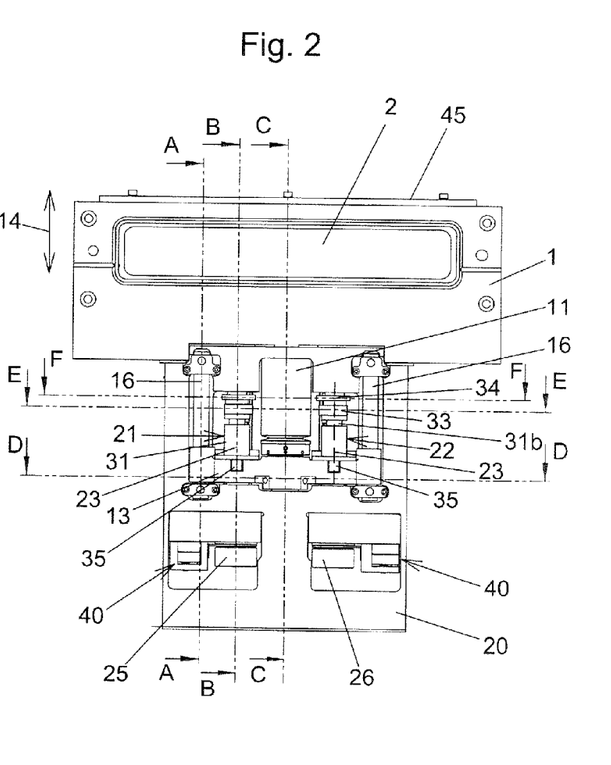
Figure 3:
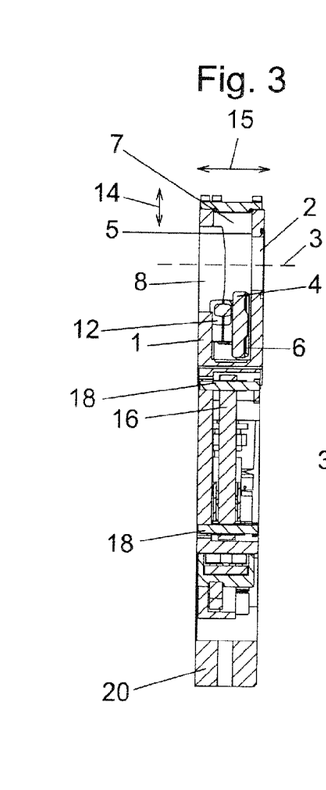
Figure 4:
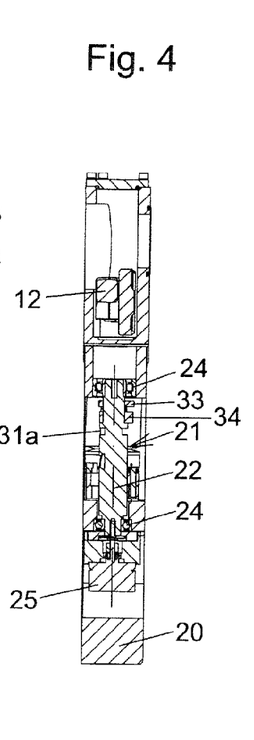
Figure 5:
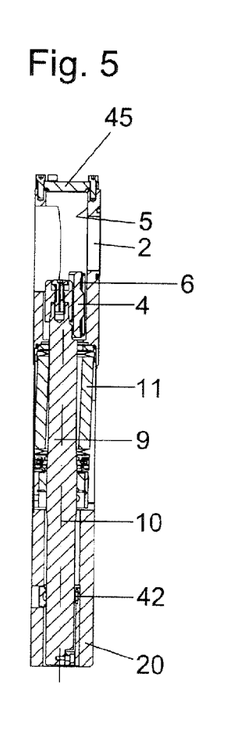
Figure 6:
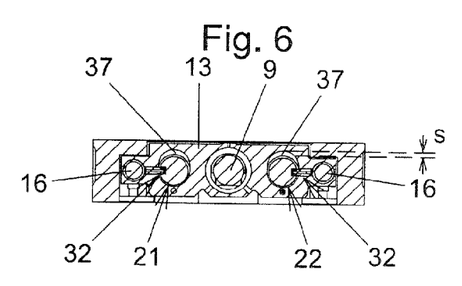
Figure 7:
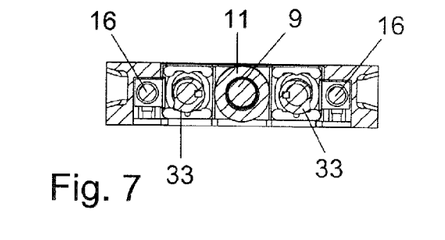
Figure 9:
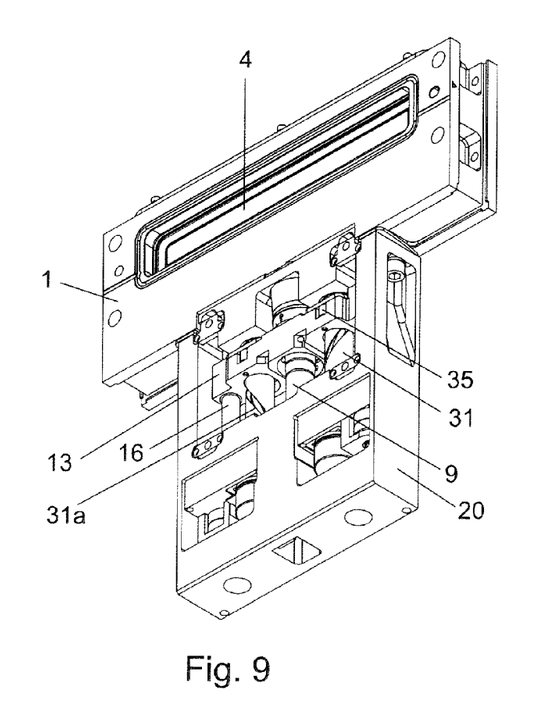
FIGS. 9 and 10 show a perspective view and view of the vacuum valve in the intermediate position of the closure member.
Figure 10:
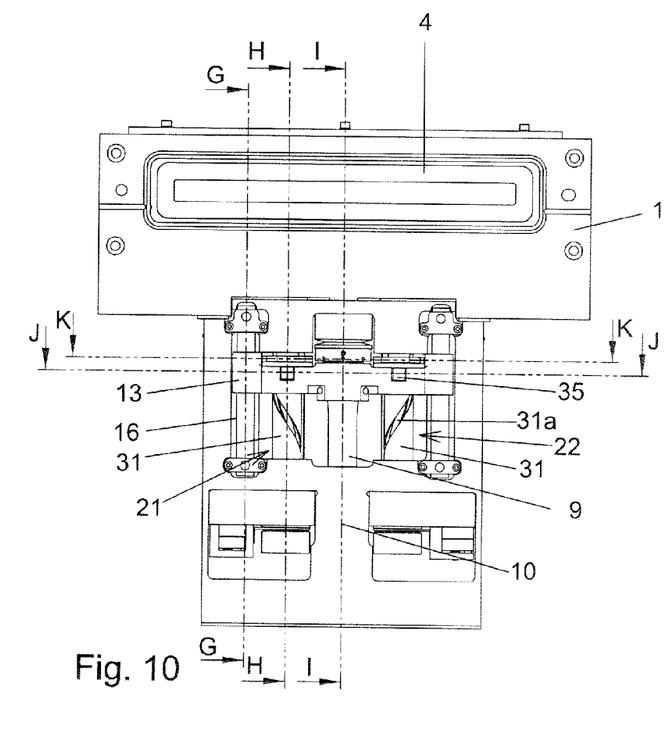
Figure 11:
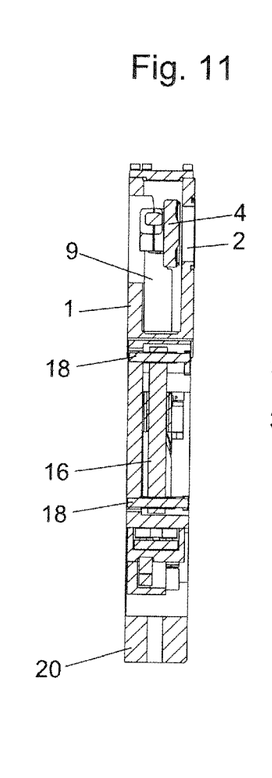
FIGS. 11 to 15 show sections along the lines GG, HH, II, JJ and KK in FIG. 10.
Figure 12:
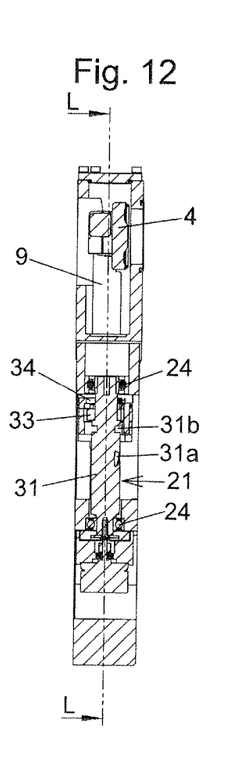
Figure 13:
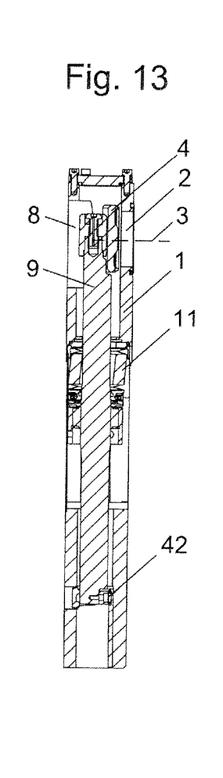
Figure 14:
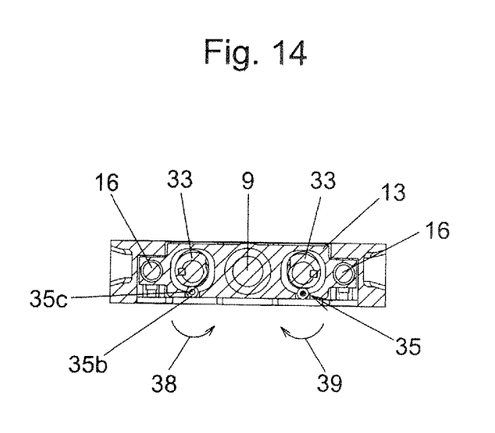
Figure 15:
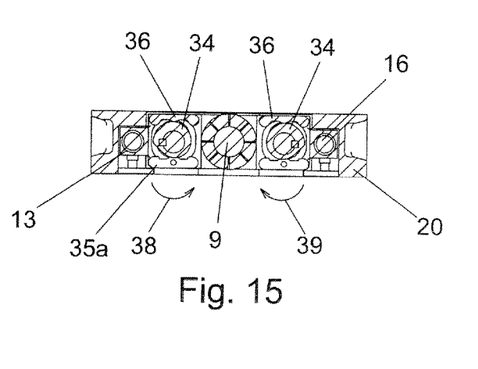
Figure 16:
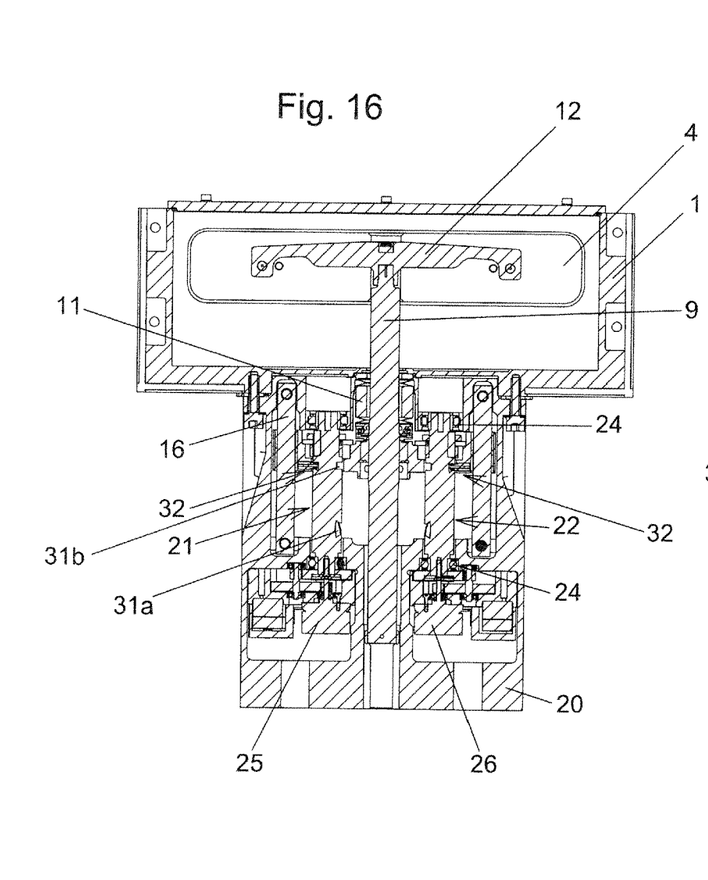
FIG. 16 shows a section along the line LL in FIG. 12.
Figure 17:
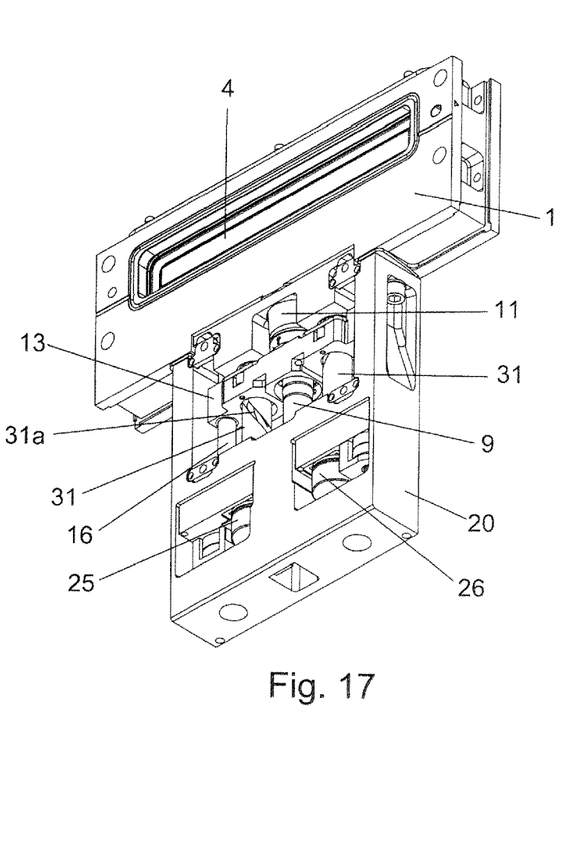
FIGS. 17 and 18 show a perspective view and view of the vacuum valve in the closed position of the closure member.
Figure 18:
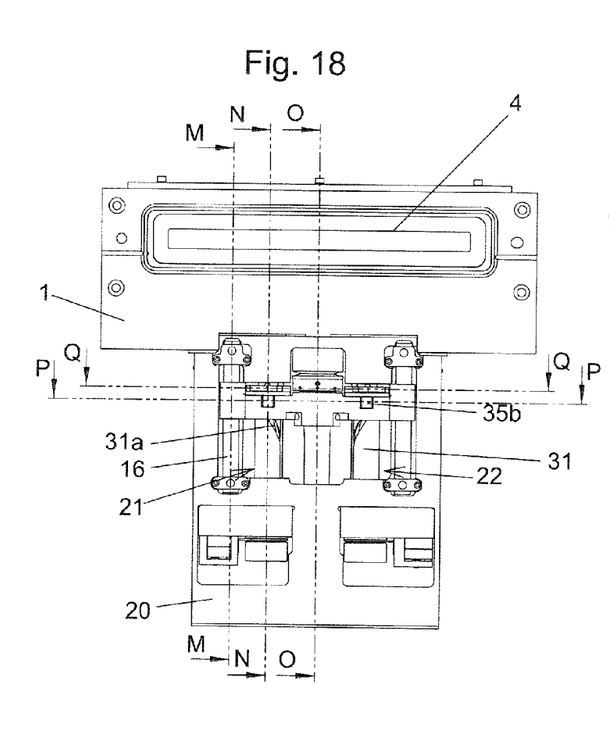
Figure 19:
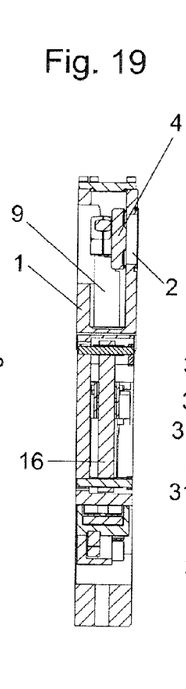
FIGS. 19 to 23 show sections along the lines MM, NN, OO, PP and QQ in FIG. 18.
Figure 20:
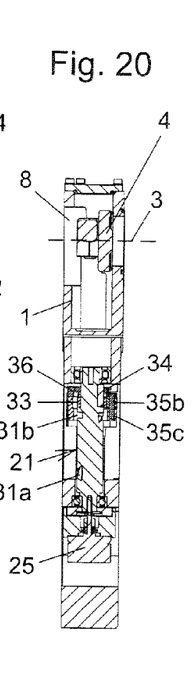
Figure 21:
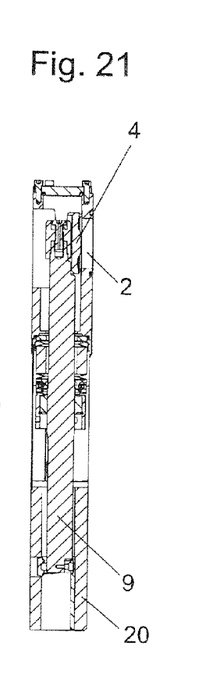
Figure 22:
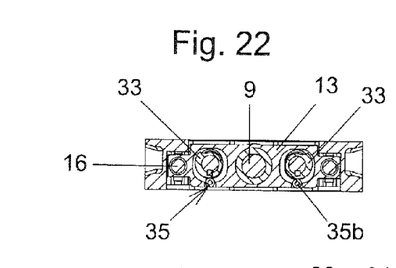
Figure 23:
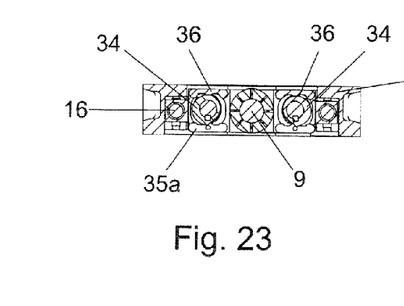
Figure 24:
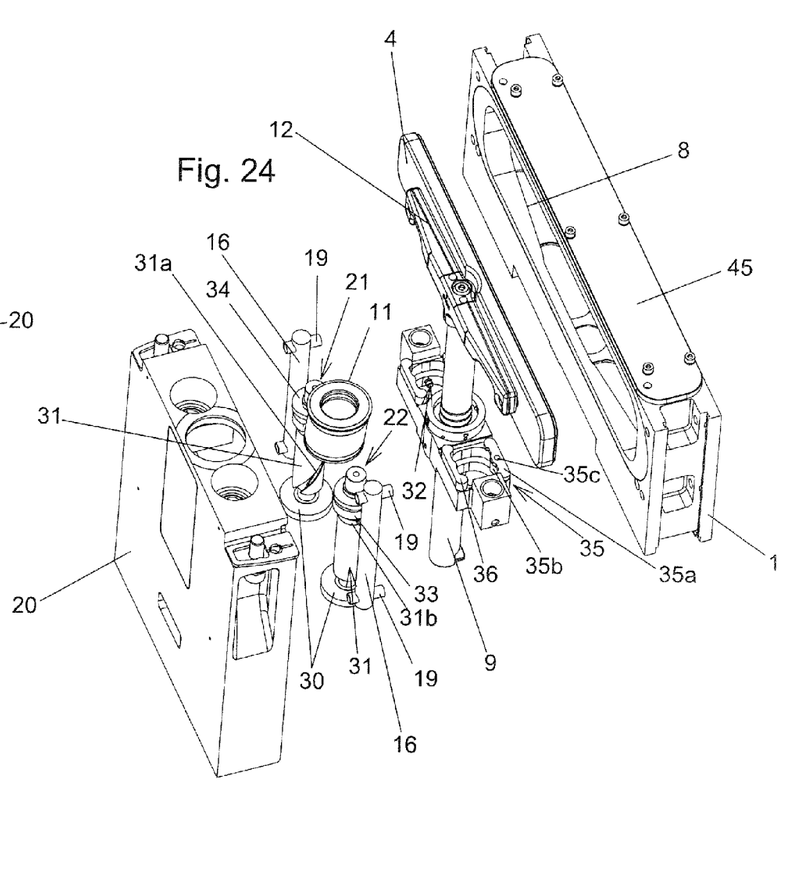
FIGS. 24 and 25 show exploded illustrations from different viewing directions.
Figure 25:
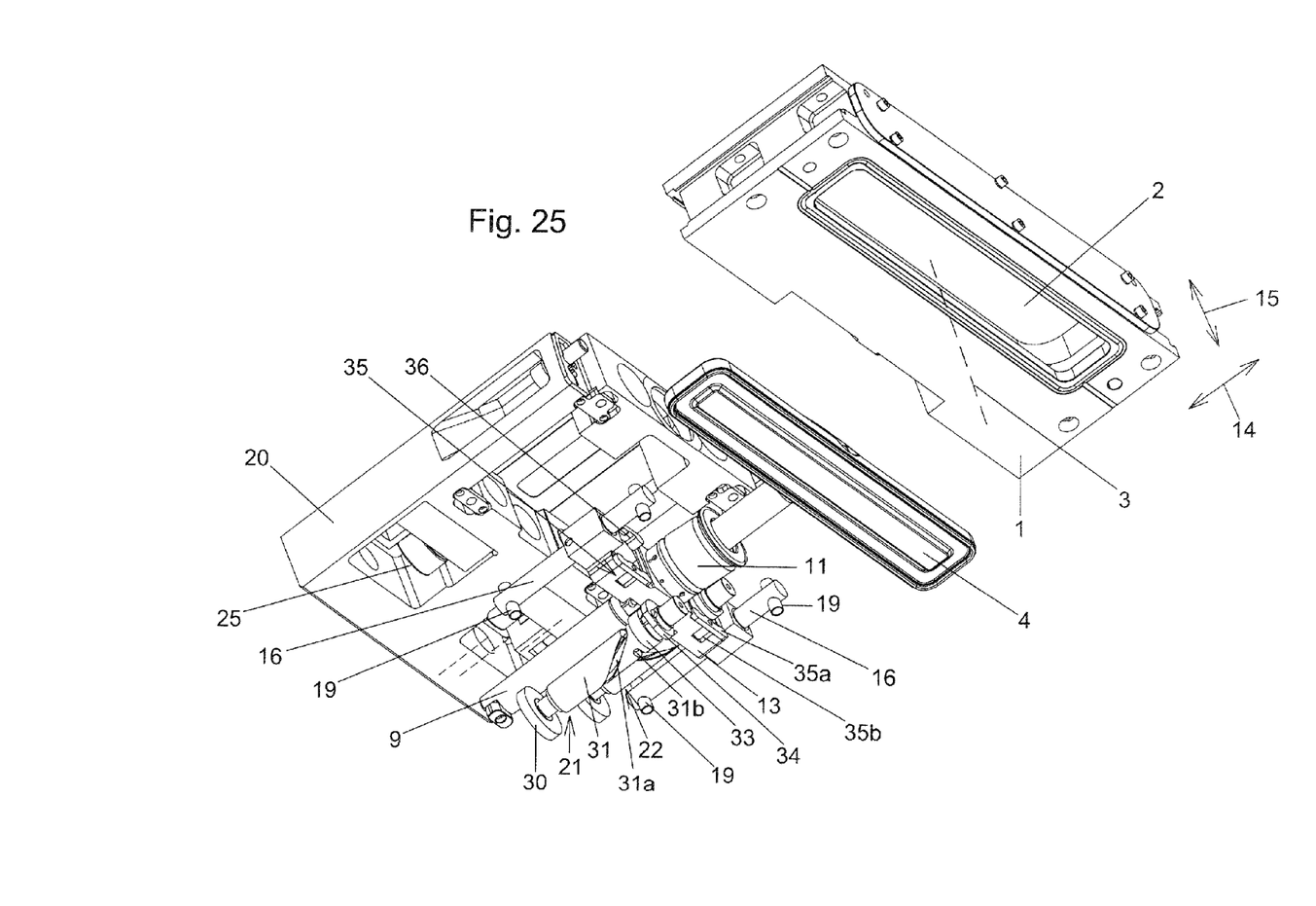
Figures 26, 27, 28, 29:
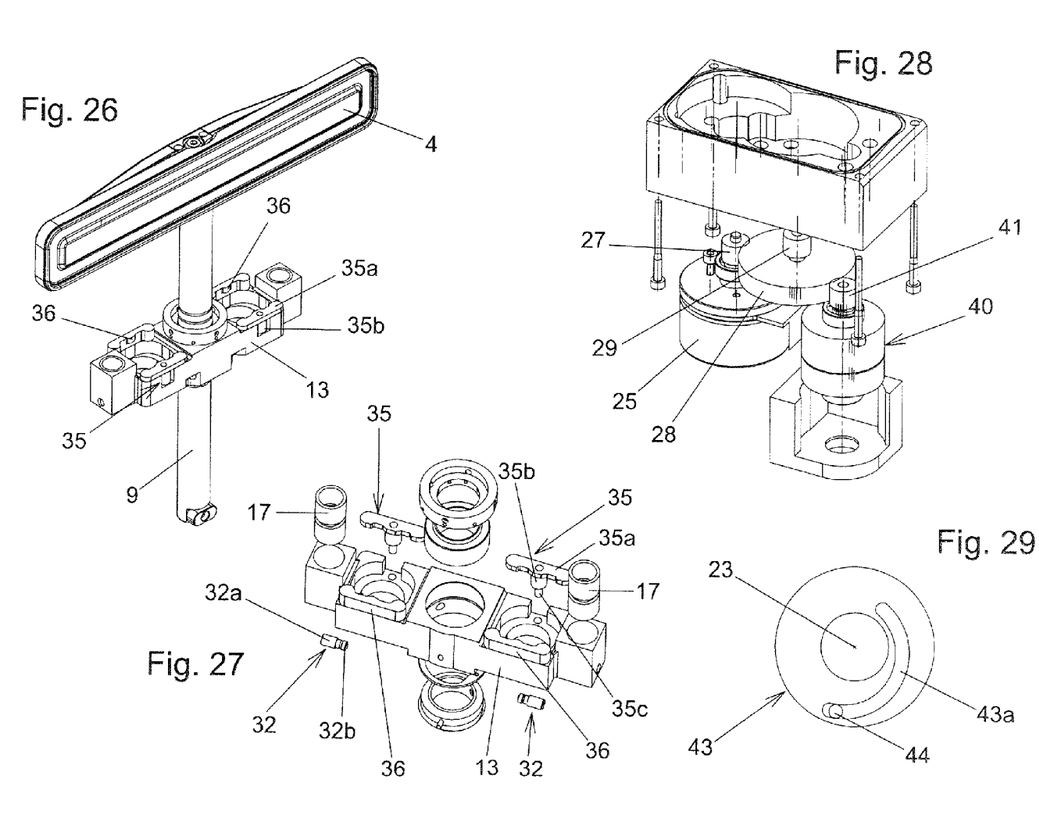
FIG. 26 shows a perspective view of the unit which comprises the closure member, the valve rod and the displacement part.
FIG. 27 shows an exploded illustration of the displacement part with the longitudinal displacement and transverse displacement engagement members.
FIG. 28 shows an exploded illustration of the drive unit comprising the drive motor, gear parts and the locking device.
FIG. 29 shows an alternative embodiment of the transverse displacement cam mechanism.

FIG. 29 shows a possible modified design for the transverse displacement cam mechanism or a respective transverse displacement cam mechanism. The transverse displacement cam member 43 is designed here in the form of a disk with a guide groove 43a in which the transverse displacement engagement member 44 engages when the closure member 4 is displaced into the position with respect to the longitudinal adjustment direction 14 which it takes up in the intermediate position and closed position (and in all of the positions located in between). The transverse displacement engagement member 44 can be formed by a pin or a pin with a roller mounted rotatably thereon.

During the displacement of the closure member from the intermediate position in the direction of the open position, the transverse displacement engagement member 44 is disengaged again from the transverse displacement cam member 43.

Figure 30:
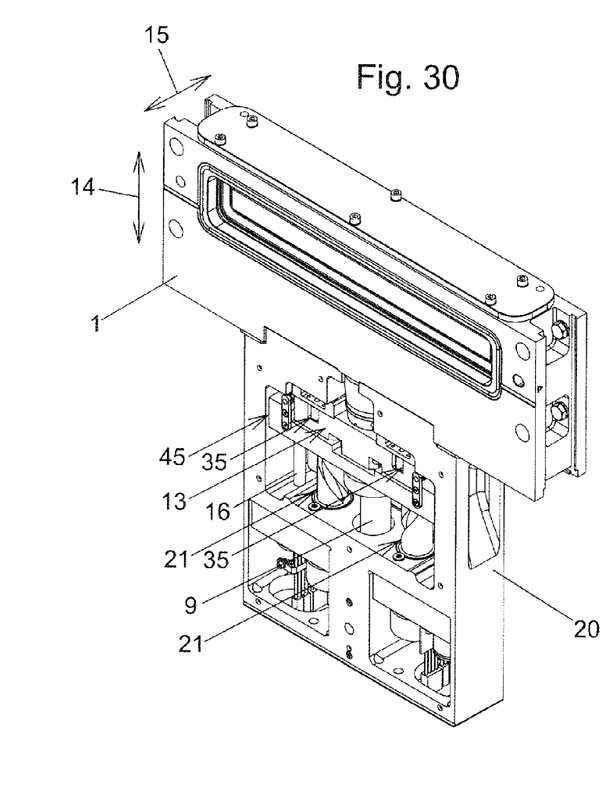
FIG. 30 shows a further exemplary embodiment in a perspective view.
Figure 31:
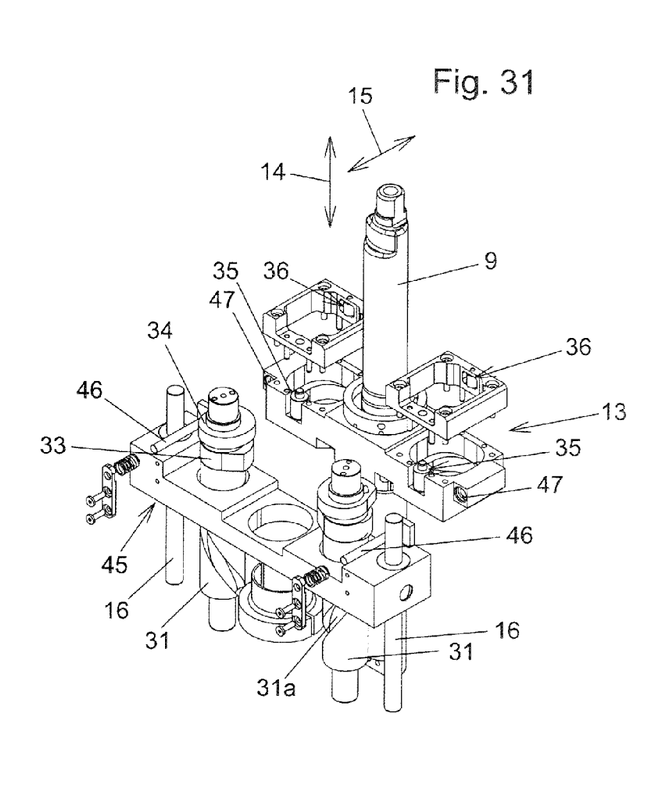
FIG. 31 shows an exploded illustration of parts of the vacuum valve according to this further exemplary embodiment.

A further exemplary embodiment is illustrated in FIGS. 30 and 31. Apart from the differences described below, the design corresponds to the exemplary embodiment corresponding to FIGS. 1 to 28, and the description for the exemplary embodiment according to FIGS. 1 to 28 is furthermore also relevant to the exemplary embodiment according to FIGS. 30 and 31, as are the possible modifications which are described.

While, in the case of the exemplary embodiment according to FIGS. 1 to 28, the displacement part 13 is connected via guides parallel to the longitudinal adjustment direction 14 to guides parallel to the transverse adjustment direction 15, in the case of the exemplary embodiment according to FIGS. 30 and 31, the displacement part 13 is connected via guides parallel to the transverse adjustment direction 15 to guides parallel to the longitudinal adjustment direction 14.

In this connection, the longitudinal guide rods 16 are secured in relation to the supporting body 20, and a slide 45 is guided displaceably along the longitudinal guide rods 16 parallel to the longitudinal adjustment direction 14. The longitudinal guide rods 16 together with the guide elements of the slide 45, which guide elements are guided along the latter, therefore form longitudinal linear guides. The slide 45, for its part, guides the displacement part 13 parallel to the transverse adjustment direction 15. For this purpose, corresponding transverse linear guides are provided. In the exemplary embodiment according to FIGS. 30 and 31, said transverse linear guides are formed by transverse guide rods 46 which are connected rigidly to the slide 45, are oriented parallel to the transverse adjustment direction 15 and by which guide bushings 47 of the displacement part 13 are guided displaceably. The displacement part 13 is held here so as to be non-displaceable in relation to the slide 45 with respect to the longitudinal adjustment direction 14.

At least one differently designed longitudinal linear guide and/or transverse linear guide could also be provided.

In this exemplary embodiment, the longitudinal displacement engagement members which are in engagement with the longitudinal displacement cam members 31 are arranged on the slide 45. In FIGS. 30 and 31, said longitudinal displacement engagement members are not visible, but could be designed completely analogously as in the exemplary embodiment according to FIGS. 1 to 28.

For the exemplary embodiment according to FIGS. 1 to 28, the transverse displacement engagement members 35, 36 are arranged on the displacement part 13, wherein the two transverse displacement engagement members here have rollers mounted rotatably about axle pins.

By use of a design according to FIGS. 30 and 31, a very stable guidance of the displacement part 13 parallel to the longitudinal adjustment direction and transverse adjustment direction 14, 15 can be formed.

When the closure member is adjusted between the intermediate position and the closed position, in this exemplary embodiment no movement of the slide and therefore of the longitudinal displacement engagement members (which are located in the slope-free portion 31b of the respective longitudinal displacement cam member 31) takes place parallel to the transverse adjustment direction. However, an arrangement of the longitudinal displacement cam members directly on the displacement part 13 would also be conceivable and possible in this exemplary embodiment.

KEY TO THE REFERENCE NUMBERS

1 Valve body
2 Valve opening
3 Axis
4 Closure member
5 Valve seat
6 Sealing ring
7 Interior space
8 Opening
9 Valve rod
10 Longitudinal axis
11 Expansion bellows
12 Connecting piece
13 Displacement part
14 Longitudinal adjustment direction
15 Transverse adjustment direction
16 Longitudinal guide rod
17 Guide bushing
18 Transverse guide rod
19 Guide bushing
20 Supporting body
21 Drive shaft
22 Drive shaft
23 Axis of rotation
24 Rolling bearing
25 Drive motor
26 Drive motor
27 Gearwheel
28 Gearwheel
29 Gearwheel
30 Gearwheel
31 Longitudinal displacement cam member
31a Portion
31b Portion
32 Longitudinal displacement engagement member
32a Pin
32b Roller
33 First transverse displacement cam member
34 Second transverse displacement cam member
35 First transverse displacement engagement member
35a Support
35b Roller
35c Axle pin
36 Second transverse displacement engagement member
37 Through opening
38 Closing direction of rotation
39 Closing direction of rotation
40 Locking device
41 Gearwheel
42 Support part
43 Transverse displacement cam member
43a Guide groove
44 Transverse displacement engagement member
45 Slide
46 Transverse guide rod
47 Guide bushing

The invention claimed is:

1. A vacuum valve, comprising
a valve body with a valve opening which has an axis and is surrounded by a valve seat,
a closure member which is adjustable parallel to a longitudinal adjustment direction between an open position, in which said closure member opens up the valve opening, and an intermediate position, in which said closure member covers the valve opening but is raised from the valve seat, and which is adjustable parallel to a transverse adjustment direction between the intermediate position and a closed position, in which said closure member lies against the valve seat,
a valve rod which supports the closure member and is mounted displaceably parallel to the longitudinal adjustment direction and parallel to the transverse adjustment direction,
a displacement part which is connected rigidly to the valve rod,
a drive motor which rotates a drive shaft about an axis of rotation lying parallel to the longitudinal adjustment direction in order to adjust the closure member between the open position, the intermediate position and the closed position, and the drive shaft has, in a first portion, a longitudinal displacement cam member of a longitudinal displacement cam mechanism that, for the adjustment of the closure member between the open position and the intermediate position, interacts with a longitudinal displacement engagement member of the longitudinal displacement cam mechanism, said longitudinal displacement engagement member being connected to the displacement part so as to be non-displaceable parallel to the longitudinal adjustment direction, and, in a second portion, has a transverse displacement cam member of a transverse displacement cam mechanism that, for the adjustment of the closure member between the intermediate position and the closed position, interacts with a transverse displacement engagement member of the transverse displacement cam mechanism, said transverse displacement engagement member being connected to the displacement part so as to be non-displaceable parallel to the transverse adjustment direction.

2. The vacuum valve as claimed in claim 1, further comprising a supporting body connected rigidly to the valve body, and wherein, for the displaceable mounting of the valve rod parallel to the longitudinal adjustment direction and parallel to the transverse adjustment direction, the displacement part is mounted so as to be displaceable relative to the supporting body, parallel to the longitudinal adjustment direction and parallel to the transverse adjustment direction.

3. The vacuum valve as claimed in claim 2, further comprising at least one longitudinal linear guide for the displacement part, said at least one longitudinal linear guide supporting the displacement part displaceably parallel to the longitudinal adjustment direction and being mounted displaceably parallel to the transverse adjustment direction by at least one transverse linear guide.

4. The vacuum valve as claimed in claim 2, further comprising a slide which is non-displaceable parallel to the transverse adjustment direction mounted displaceably parallel to the longitudinal adjustment direction by at least one longitudinal linear guide, and the slide supports the displacement part displaceably parallel to the transverse adjustment direction, wherein the displacement part is held so as to be non-displaceable in relation to the slide parallel to the longitudinal adjustment direction.

5. The vacuum valve as claimed in claim 1, wherein the transverse displacement cam member comprises a cam disk with an outer surface for guiding the transverse displacement engagement member, or the transverse displacement cam member has a guide groove that forms a groove guide for the transverse displacement engagement member.

6. The vacuum valve as claimed in claim 5, the drive shaft has, in the second portion, in addition to the transverse displacement cam member that forms a first transverse displacement cam member, a second transverse displacement cam member to form a double cam disk and which interact with the transverse displacement engagement member that forms a first transverse displacement engagement member and a second transverse displacement engagement member.

7. The vacuum valve as claimed in claim 1, wherein a cam formed by the longitudinal displacement cam member has a slope-free portion, and the longitudinal displacement engagement member passes into the slope-free portion at an end of the adjustment of the closure member from the open position into the intermediate position.

8. The vacuum valve as claimed in claim 1, wherein the longitudinal displacement cam mechanism is a cylindrical cam mechanism.

9. The vacuum valve as claimed in claim 1, wherein the drive shaft is a first drive shaft and further comprising a second drive shaft, the first and second drive shafts which are rotatable about respective axis of rotation by the drive motor or by a respective drive motor and each of the first and second drive shafts have, in the first portion, the longitudinal displacement cam member of a respective longitudinal displacement cam mechanism that in each case interacts with a respective longitudinal displacement engagement member of the respective longitudinal displacement cam mechanism, and which each have, in a second portion, a respective transverse displacement cam member of a respective transverse displacement cam mechanism that interacts in each case with a respective transverse displacement engagement member of the respective transverse displacement cam mechanism.

10. The vacuum valve as claimed in claim 1, wherein the valve rod has a longitudinal axis that extends parallel to the longitudinal adjustment direction.

11. The vacuum valve as claimed in claim 1, further comprising a locking device by which the rotation of the drive shaft about the axis of rotation is blockable.

* * * * *